(12) United States Patent
Brown, Jr. et al.

(10) Patent No.: US 11,419,274 B2
(45) Date of Patent: Aug. 23, 2022

(54) HIGH DENSITY DOUBLE SMALL SQUARE BALER

(71) Applicant: GFC, Pittsfield, IL (US)

(72) Inventors: Owen J Brown, Jr., Pittsfield, IL (US); Bensend Thompson, Louisiana, MO (US)

(73) Assignee: Pike Mfg.Corp., Alpena, MI (US)

( * ) Notice: Subject to any disclaimer, the term of this patent is extended or adjusted under 35 U.S.C. 154(b) by 266 days.

(21) Appl. No.: 16/175,780

(22) Filed: Oct. 30, 2018

(65) Prior Publication Data

US 2019/0133047 A1    May 9, 2019

Related U.S. Application Data

(60) Provisional application No. 62/578,548, filed on Oct. 30, 2017.

(51) Int. Cl.
*A01F 15/14* (2006.01)
*A01F 15/16* (2006.01)
*A01F 15/12* (2006.01)

(52) U.S. Cl.
CPC ............ *A01F 15/145* (2013.01); *A01F 15/12* (2013.01); *A01F 15/16* (2013.01)

(58) Field of Classification Search
CPC ........ A01F 15/145; A01F 15/12; A01F 15/16; A01F 15/14; B65B 13/26; A01D 59/04
USPC .............................. 289/216, 2, 10; 100/19 R
See application file for complete search history.

(56) References Cited

U.S. PATENT DOCUMENTS

| | | | | |
|---|---|---|---|---|
| 4,206,698 | A * | 6/1980 | Nicholson ............ | A01D 85/002 100/17 |
| 5,829,346 | A * | 11/1998 | Ast ....................... | A01F 15/145 100/21 |
| 2015/0097370 | A1 * | 4/2015 | Schumacher ......... | A01F 15/145 289/1.5 |

* cited by examiner

*Primary Examiner* — Nathan E Durham
*Assistant Examiner* — Abby M Spatz
(74) *Attorney, Agent, or Firm* — Warner Norcross + Judd LLP

(57) ABSTRACT

A multi-part square baler produces multi-part bales that each include two smaller single bales. The baler includes a double knotter configured to tie first and second four string knots that connect the ends of a multi-bale top-string and a multi-bale cincture string encompassing the two small single bales. The double knotter is also configured to tie a two-string knot on the strings encompassing the first small bale and another two-string knot on the strings encompassing the second small bale. The strings encompassing each of the small single bales are also tied into a respective one of the two four-string knots.

7 Claims, 7 Drawing Sheets

HIGH DENSITY DOUBLE SMALL SQUARE BALER

CROSS-REFERENCE TO RELATED APPLICATIONS

The present application claims priority from, and incorporates by reference in its entirety, provisional U.S. patent application 62/578,548 filed Oct. 30, 2017.

BACKGROUND

Technical Field

Various embodiments of the present invention relate to balers for collecting and baling hay or other crops. More particularly, the present invention pertains to various embodiments of a baler that produces multi-part bales.

Description of Related Art

Before the advent of mechanized balers hay and other roughage crops were moved from the windrow into stacks. Supplies of hay kept in hay stacks were difficult to move, and vulnerable to spoilage. New Holland developed a mobile square baler in the 1940s capable of baling hay in the field. Balers that formed hay into small square bales held together by twine or wire made it easier to move and store hay, as well as cutting down on loss due to spoilage. Small square bales—actually rectangular in shape—typically weigh from 40 to 75 pounds. Even though hay handling with square bales is more efficient than having with loose stacks, handling small square bales still involved a great deal of back breaking labor to move the bales on and off vehicles and into place for transport and storage.

In the 1970s large round balers became popular. Farmers using this technology bale their hay into large cylindrical bales weighing from 900 to 1,200 pounds. The use of large round bales cut down on the back breaking labor involved in having. Large round bales are too large to move by hand. So movement and handling of large round bales is done using a hydraulic bale fork attached to a tractor to lift the bales onto a trailer or truck for transport to a storage facility.

Although large round bales are used for the overwhelming majority of hay produced today, there are still some applications for which small square bales are required. For example, the straw and hay taken to horse and cattle shows is typically in the form of small square bales. Further, home and garden stores sell small square bales of straw for grass planting and yardwork purposes.

The New Holland BC5000 is an example of a typical conventional small square baler in use today. All conventional small square balers operate by compressing the hay to shape, tying and knotting the bale, pushing the completed bale out the back, and then compressing more hay for the next bale. This is performed on the go as a continuous flow operation. The hay baler is driven through the field picking up a windrow of hay or straw at one end, and pushing out bales of hay or straw at the other end.

BRIEF SUMMARY

The present inventors recognized certain disadvantages and shortcomings of conventional hay balers for small square bales. The present inventors also recognized a market that is not being served by conventional small square hay balers. Various embodiments disclosed herein overcome the disadvantages and shortcomings of conventional devices, and produce small bales that meet a market need that previously remained unserved. Various embodiments disclosed herein are drawn to a high density double small square baler that ties multiple short, individually tied bales together into a larger sized multi-part bale.

The various embodiments are drawn to a multi-part square baler that includes a bale chamber configured to receive a multi-part bale that is encompassed by a multi-bale string assembly. The multi-part bale includes two smaller single bales that are each respectively encompassed by a single-bale string assembly. The embodiments include at least four string sources that provide string for a multi-bale top-string, a multi-bale cincture-string, two single-bale top-strings and two single-bale cincture-strings. Each single-bale top-string is tied to a single-bale cincture-string to encompass a single bale. The multi-bale top-string is tied to a multi-bale cincture-string to encompass both of the single bales into a multi-part bale.

The various embodiments include a double knotter configured to tie a four-string knot comprising a first single-bale top-string, the multi-bale top-string, a first single-bale cincture-string and the multi-bale cincture-string. The knotter also ties a two-string knot on the respective string assemblies encompassing each of the single bales. A needle is used to feed the various string components into the knotter. The various embodiments feature a shifter that shifts the multi-bale top-string and the multi-bale cincture-string out of the string plane as the needle feeds the first single-bale top-string and the first single-bale cincture-string into the knotter.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 1B depicts twine knots used in accordance with various embodiments disclosed herein.

DETAILED DESCRIPTION

The present inventors recognized that shipping and storing costs for small square hay bales add significantly to the overall price paid by the end user. The present inventors further recognized the value that may be realized by shipping and storing hay in a denser, heavier format (e.g., compacted dual small square bales) while still being able to deliver hay sized like standard sized small square bales to the end user. Standard sized small square bales are approximately 14" high×18" wide×40" long. Various embodiments of the present invention create pairs of decreased volume single square bales, tying them together to form a multi-part standard sized bale. In various embodiments these mini square bales may be compressed to have a higher density than standard sized small square bales. This allows more hay to be shipped and stored in existing transport vehicles and hay storage facilities.

In addition, each single bale that makes up a multi-part bale is smaller than a standard sized small square bale. The present inventors recognized a need in the marketplace for straw and hay bales that are smaller than the standard sized small square bale. For example, homeowners often need a small amount of straw for a flower bed or gardening purposes. It can be difficult for a homeowner to purchase an entire standard sized small square bale of straw and transport it home in an automobile. Further, it's more convenient for garden stores to shelve smaller sized mini bales inside the store, as opposed to the larger standard sized small square bales. Up to this point hay bales smaller than a standard sized small square bale have not been made available in the marketplace. Thus, the various embodiments meet a need in the marketplace that has not previously been served.

Figure 1A:
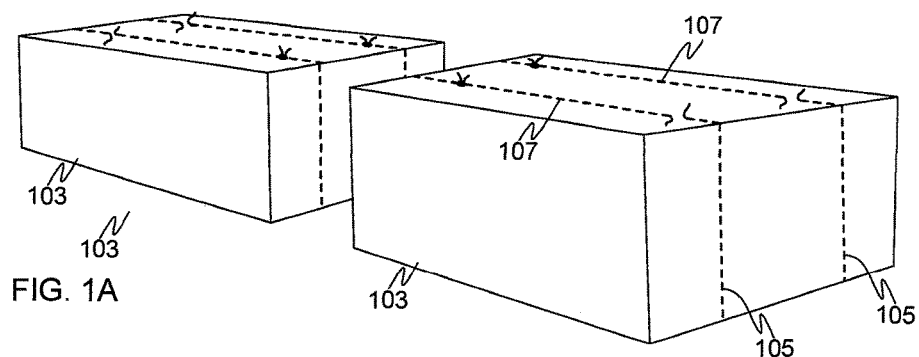
FIG. 1A depicts a perspective view of a pair of small square bales according to various embodiments disclosed herein.

FIG. 1A depicts a perspective view of a pair of single square bales 103 according to various embodiments disclosed herein. The single square bales 103 are each tied together (or baled) with a single-bale string assembly 117. Typically, the single square bales 103 are baled with two single-bale string assemblies 117, as shown in the embodiment depicted in the figures. In other embodiments, however, three string assemblies may be used to form the bales, for example, when baling larger sized multi-part bales or when baling heavier materials that require additional support.

Figure 1B:
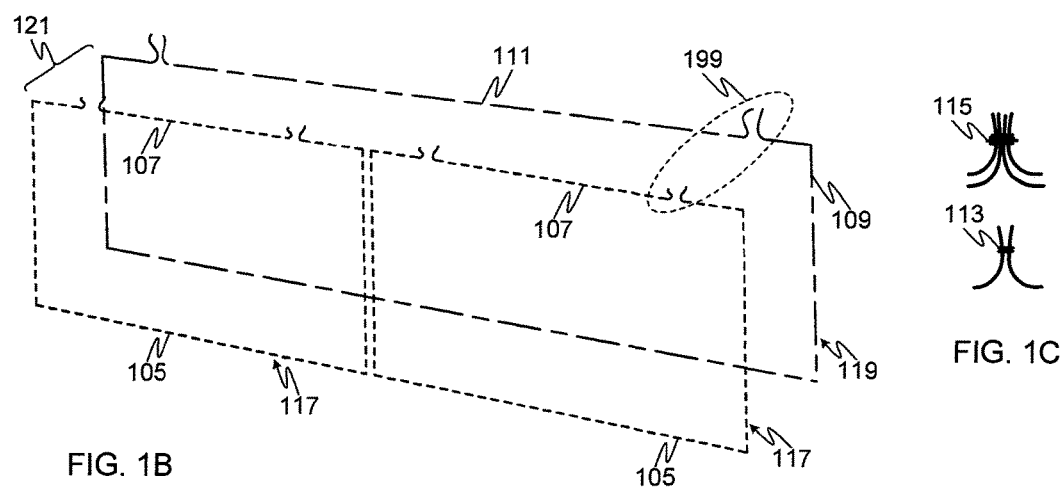
FIG. 1B depicts a string assembly configured to capture a pair of small square bales according to various embodiments disclosed herein.
Figure 1C:
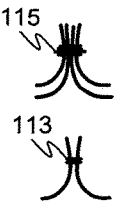
FIG. 1C depicts a four-string knot and a two-string knot used to tie the string assemblies together in various embodiments disclosed herein.

FIG. 1B depicts one row of string assemblies used to bale a multi-part bale according to various embodiments. FIG. 1C depicts the two types of knots used to tie the string assemblies together. Each of the single bales 103 is baled with a short top-string 107 and a short cincture-string 105 tied together to form a single-bale string assembly 117. Of the two knots in each single-bale string assembly 117 one knot is a two-string knot 113 and the other knot is a four-string knot 115 as shown in FIG. 1C. The multi-part bale 101 is made from two single bales 103 tied together with a multi-bale string assembly 119 that includes a long top-string 111 and a long cincture-string 109. Both knots used to tie the multi-bale string assembly 119 together are four-string knots 115. Each four-string knot includes two strings from the multi-bale string assembly 119 and two strings from the single-bale string assembly 117.

The top and side portions of the multi-bale string assembly 119 run parallel to corresponding parts of the single-bale string assemblies 117. Some of the multi-bale knots are tied together with all four strings in a four-string knot 115, while other knots only tie two of the string assemblies in a two-string knot 113. The location of the four string knots and two string knots can be determined in looking at FIG. 1B. The four-string knots 115 are located at both ends of long top-string 111 where four ends of string components meet, as shown in area 199 of FIG. 1B. Each four-string knot 115 includes: (1) an end of the long top-string 111, (2) an end of the long cincture-string 109, (3) an end of a short top-string 107 and (4) an end of a short cincture-string 105. Each two-string knot 113 includes: (1) an end of a short top-string 107 and (2) an end of a short cincture-string 105.

Figure 1D:
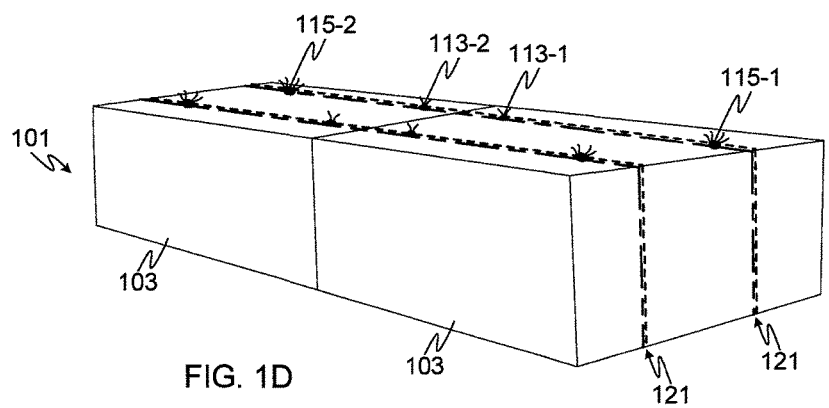
FIG. 1D depicts a perspective view of multi-part bale according to various embodiments disclosed herein.

FIG. 1D depicts a multi-part bale 101 formed by tying two single square bales 103 together with a row of string assemblies 121. A row of string assemblies (e.g., 121) is defined to include the string assembly 119 around the multi-part bale and the string assemblies 117 around the single bales. The string assemblies in a row of string assemblies 121 are typically planar, that is, they are all within the same string plane. Each string assembly includes two or more pieces of string. For example, string assembly 117 includes short cincture-string 105 and short top-string 107. String assembly 119 includes long cincture-string 109 and long top-string 111. The multi-part bale 101 shown in the figure is tied with two rows of string assemblies 121 in the same general locations as the two strings of a typical two-string bale. Other embodiments may be implemented using three rows of string assemblies in same general locations as a typical three string bale. Each of the string assembly rows 121 of FIG. 1D includes a multi-bale string assembly 119 and two single-bale string assemblies 117 as shown in FIG. 1B. The first single bale (on the right of FIG. 1D) is tied with four-string knot 115-1 and two-string knot 113-1. The other single bale (on the left) is tied with four-string knot 115-2 and two-string knot 113-2. The multi-part bale 101 is formed by tying the two single bales 103 together with string assembly 119. Each string assembly 119 is tied with two four-string knots 115-1 and 115-2. The long top-string 111 of string assembly 119 (shown in FIG. 1B) is not tied into knots 113-1 or 113-2 of FIG. 1D.

Figure 2A:
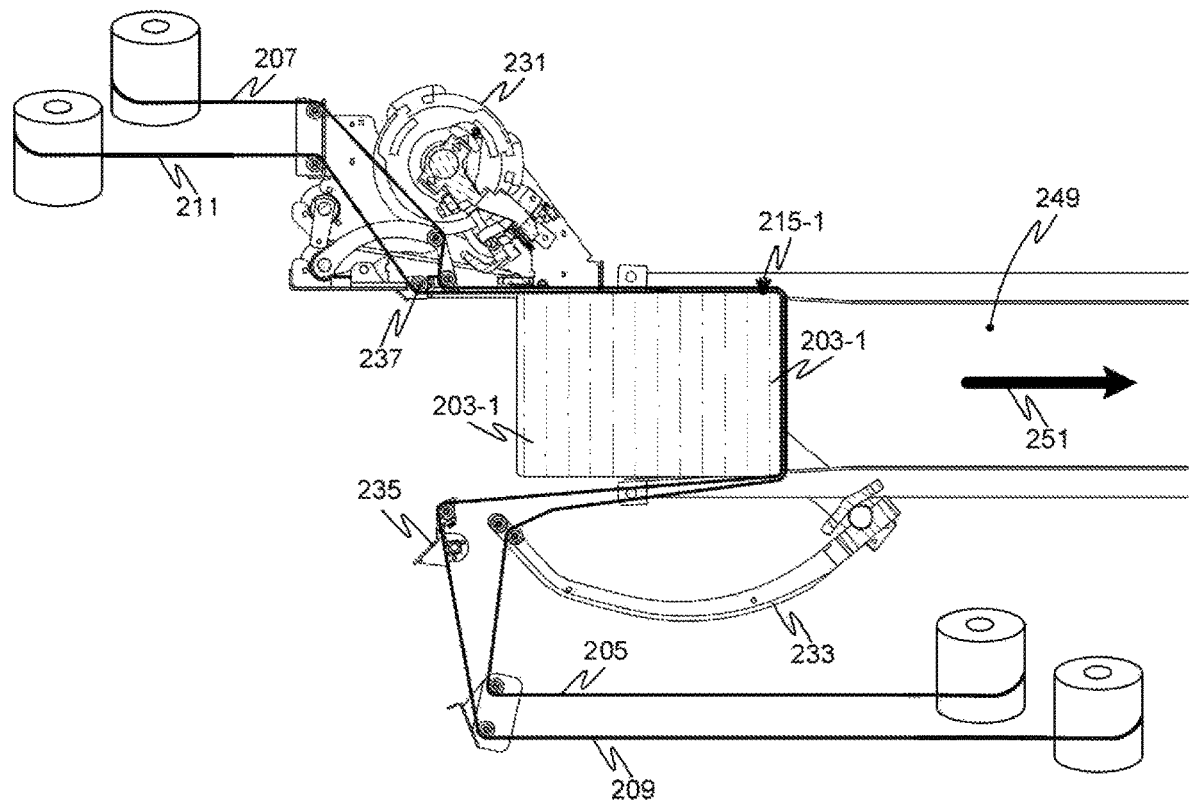
FIGS. 2A-I are cutaway side views of a high density double small square baler according to various embodiments disclosed herein.

FIGS. 2A-I are cutaway side views of a high density double small square baler depicting different stages in tying a multi-part bale. FIGS. 2A-I depict the mechanisms for producing one string assembly row 121 as shown in FIG. 1D. Since bales generally have at least two string assembly rows, a typical baler would have another set of mechanisms similar to that shown in FIGS. 2A-I to produce a second, parallel string assembly row 121 on each multi-part bale. FIG. 2A depicts a first stage in the process where hay is pushed into place for completing the first single bale 203-1. Direction 251 of FIG. 2A shows the direction of flow that a multi-part bale takes within the bale chamber 249 of a double small square baler as the bale is being made. A high density double small square baler includes a double knotter 231, a needle 233 and a lower shifter 235 and an upper shifter 237. As the multi-part bale is being made the needle 233 is configured to hinge around from its initial position beneath the bale as shown in FIG. 2A, passing behind the bale and pushing string up into the double knotter 231. This motion of the needle 233 can be seen in FIGS. 2A-I. The needle 233 makes two passes for each multi-part bale made of two single bales as shown in the figures. The needle 233 makes a first pass to tie the first single bale 203-1 as shown in FIGS. 2A-D. During the second pass, FIGS. 2E-I, the needle 233 ties the second single bale 203-2 and also completes the string assembly encompassing the multi-part bale by fastening the two single bales together.

The double knotter 231 can tie either a two-string knot 113 or a four-string knot 115, as per the knots shown in FIG. 1C. Double knotter 231 ties a knot near both ends of the top side of the multi-part bale. This produces a two piece string assembly as shown in FIG. 1B. Upon tying the last knot in a bale, the double knotter 231 ties the first knot of the next bale. This eliminates the need to hold the twine in a twine holder. The double knotter 231 is configured to receive strings pushed into its assembly by the needle 233. Four different string spools are used to feed the string for each string assembly row 121. (Referring back to FIG. 1B, a string assembly row 121 includes two single-bale string assemblies 117 and the multi-bale string assembly 119.) Spool 207 serves as a string source, feeding the short top-strings 107 of FIG. 1B to the double knotter 231. Spool 211 is the string source that feeds the long top-strings 111. (The short top-strings 107 may also be called single-bale top-strings 107 and the long top-strings 111 may also be called multi-bale top-strings 111). Spool 205 is the string source that feeds the short cincture-strings 105, and spool 209 is the string source that feeds the long cincture-strings 109. (The short cincture-strings 105 may also be called single-bale cincture strings 105 and the long cincture-strings 109 may also be called multi-bale cincture-strings 109).

Figure 2B:
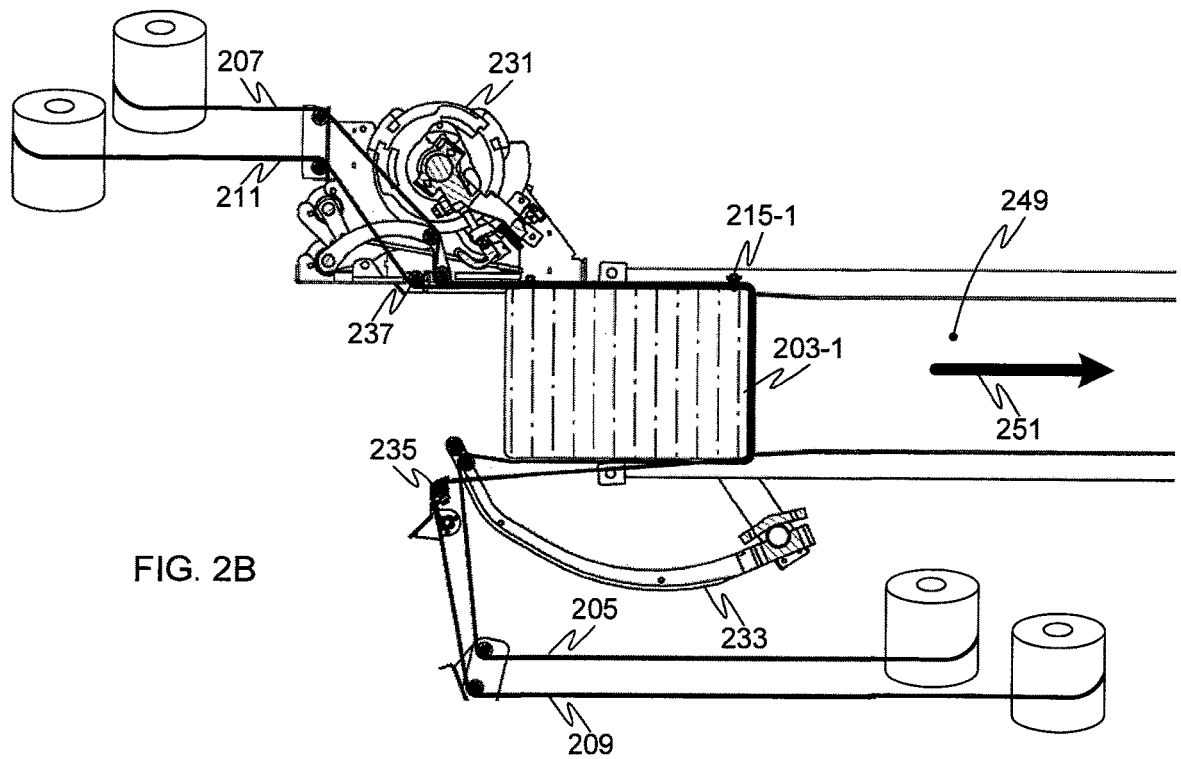

Turning to FIG. 2A, at this point knot 215-1 has been tied connecting the four strings: (1) the long top-string 211, (2) the long cincture-string 209, (3) the first short top-string 207 and (4) the first short cincture-string 205. The needle 233 remains in its initial position beneath the path of the bales in FIG. 2A. In FIG. 2B the needle 233 begins hinging upward behind the first single bale 203-1, picking up the short cincture-string 205. At this point the lower shifter 235 has shifted the long cincture-string 209 out of the way (e.g., to the side out of the string plane), allowing needle 233 to pass by the long cincture-string 209. The long cincture-string 209 is bypassed because it will run along the bottom of the both the first single bale 203-1 and the second single bale 203-2. In some implementations the lower shifter 235 and upper shifter 237 may be combined or tied together to move in unison. In other implementations the lower shifter 235 may move independently of the upper shifter 237. For the purposes of this explanation a shifter that shifts strings destined for the top of the bale is considered to be a different shifter than the shifter that shifts strings destined for the bottom of the bale, regardless of whether the shifters are tied together to operate in unison or otherwise combined.

Figure 2C:
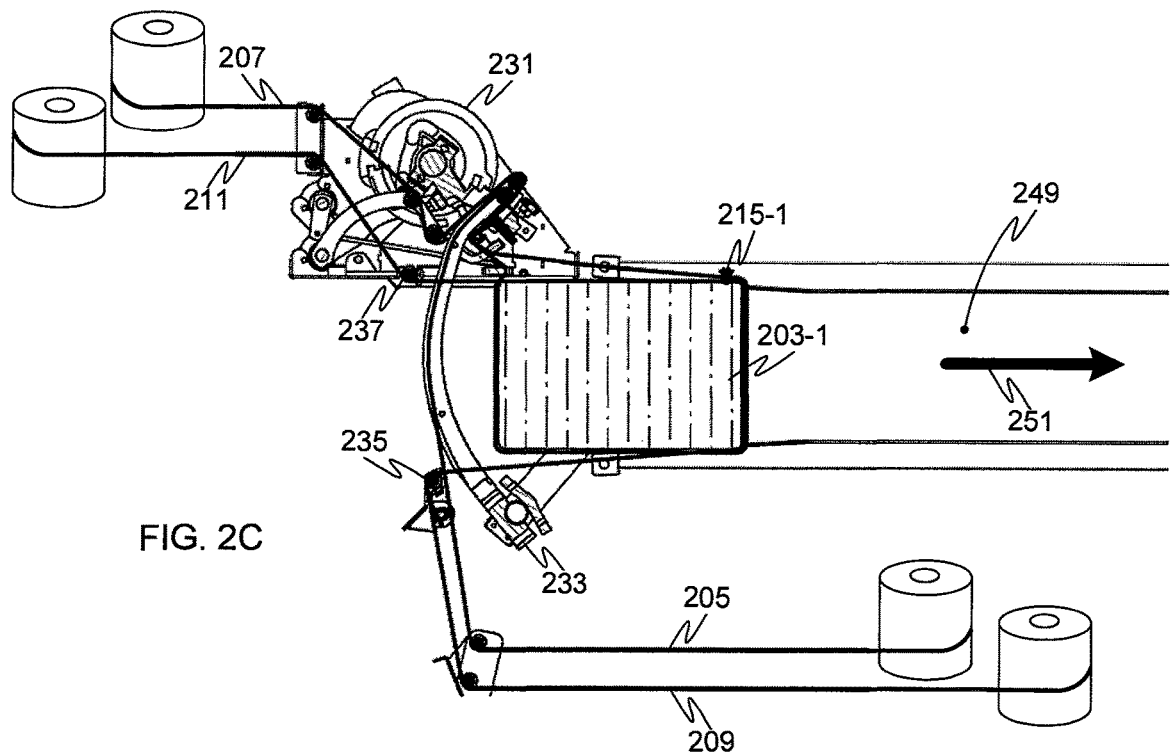

FIG. 2C depicts the needle 233 pushing upward into double knotter 231. At this point the upper shifter 237 has shifted long top-string 211 out the way (e.g., to the side out of the string plane), but leaves the short top-string 207 in place. The needle 233 picks up short top-string 207 as it moves upward, providing both the short top-string 207 and the short cincture-string 205 to the double knotter 231 to tie a knot and complete the string assembly around first single bale 203-1.

Figure 2D:
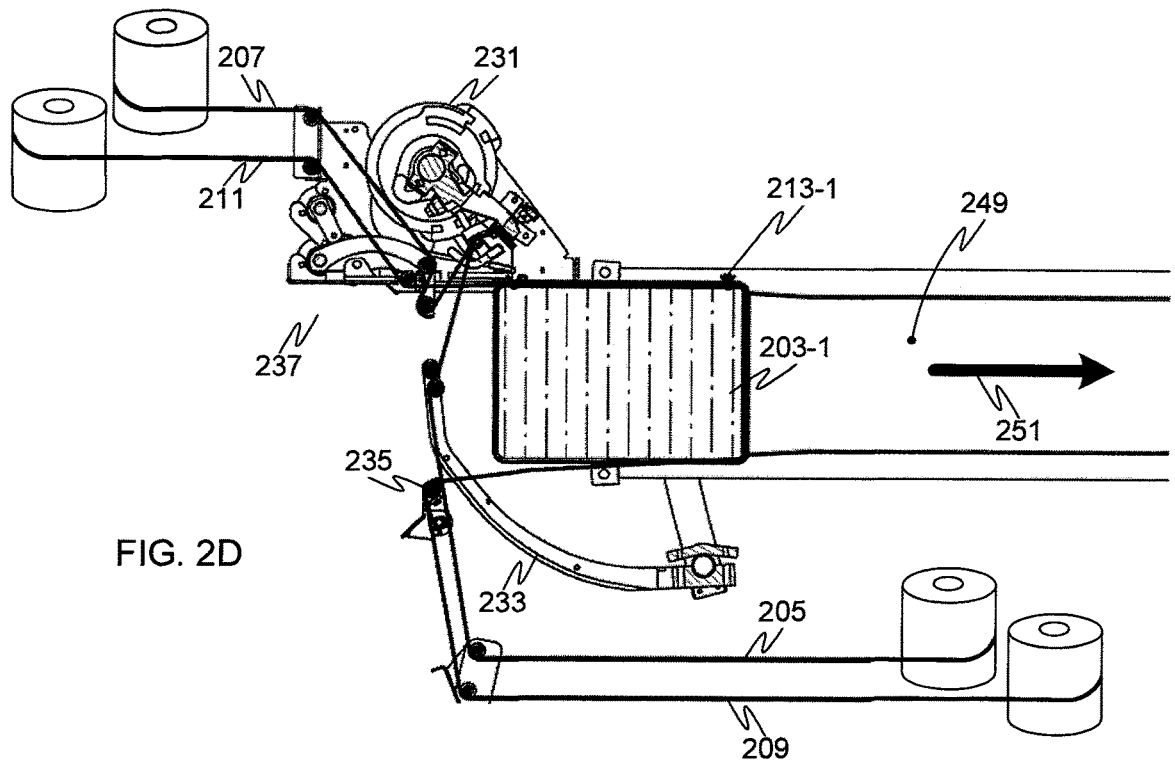
Figure 2E:
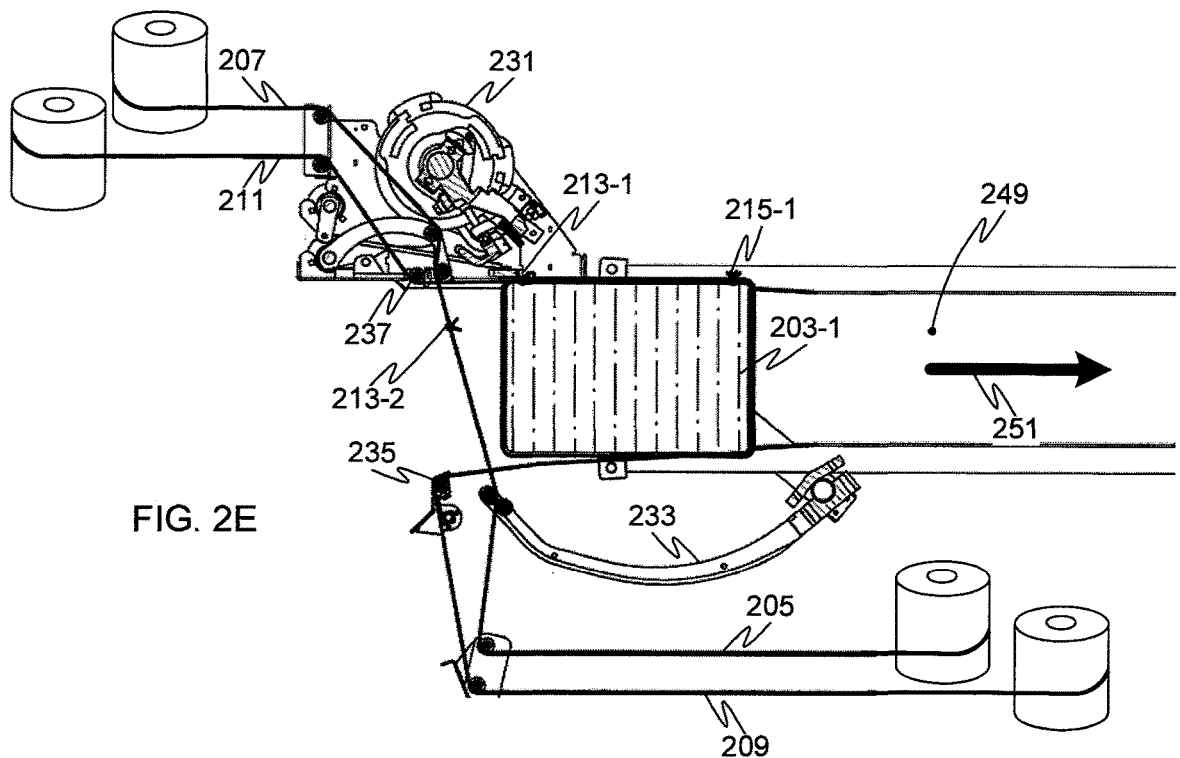

In FIG. 2D the double knotter 231 completes the string assembly around the first single bale 203-1 by tying a two-string knot 213-1, and cutting both the short top-string 207 and short cincture-string 205. The double knotter 231 ties the short top-string 207 from the spool to short cincture-string 205 from its spool in a two-string knot 213-2 for the second single bale 203-2. FIG. 2E shows the needle 233 back down in its initial position beneath the bale chamber 249. Double string knot 213-2 ties short top-string 207 spool to short cincture-string 205 spool.

Figure 2F:
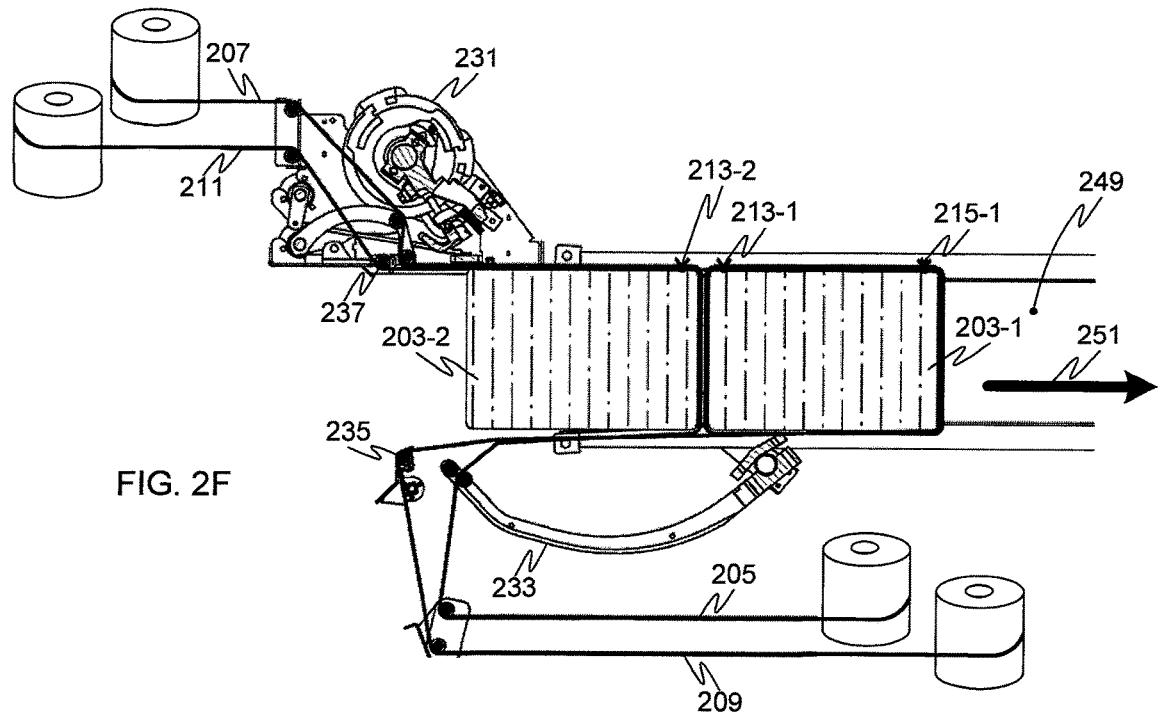
Figure 2G:
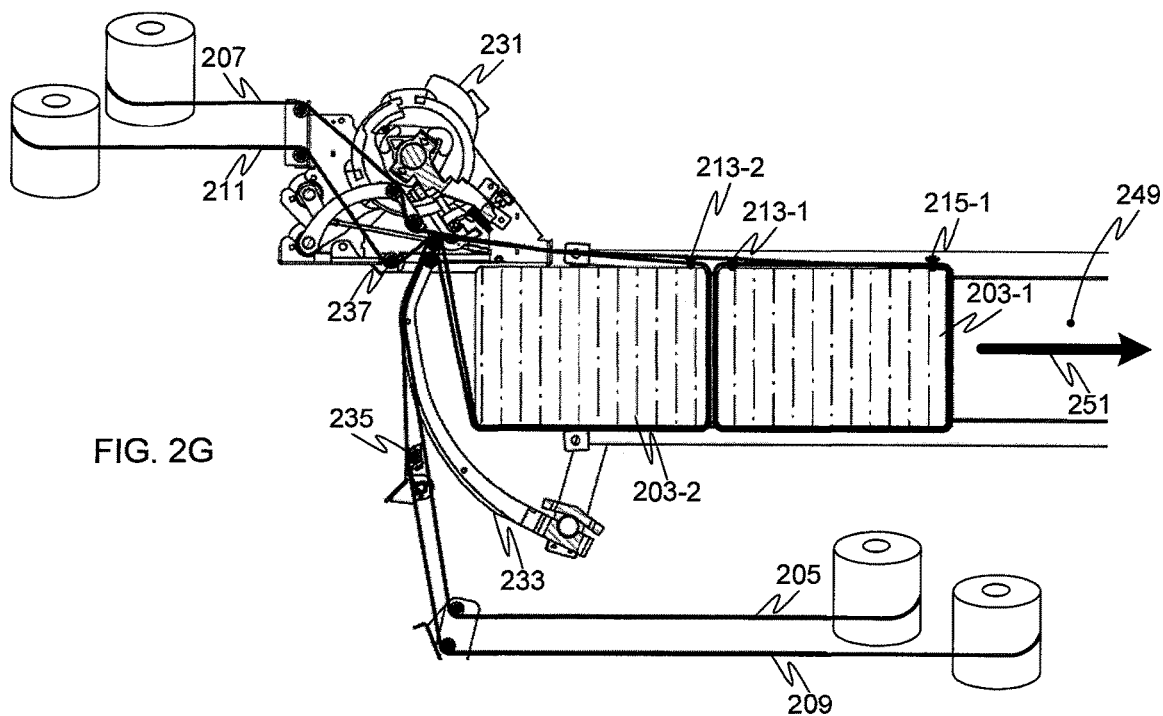
Figure 2H:
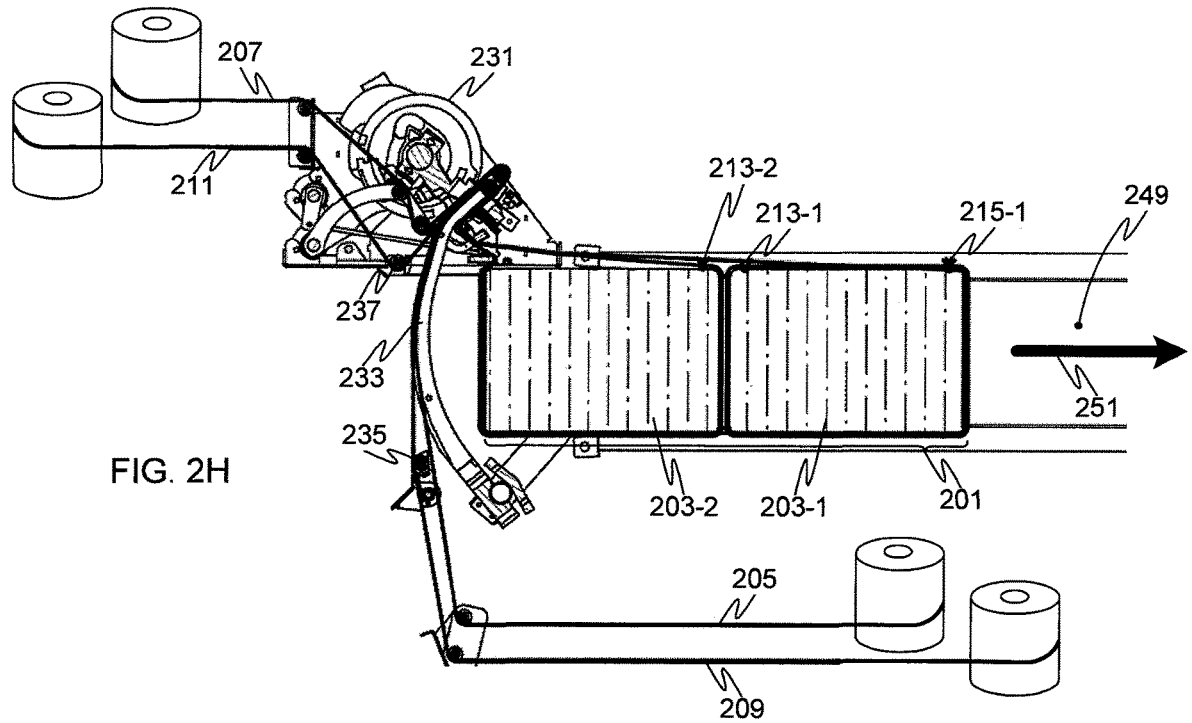
Figure 2I:
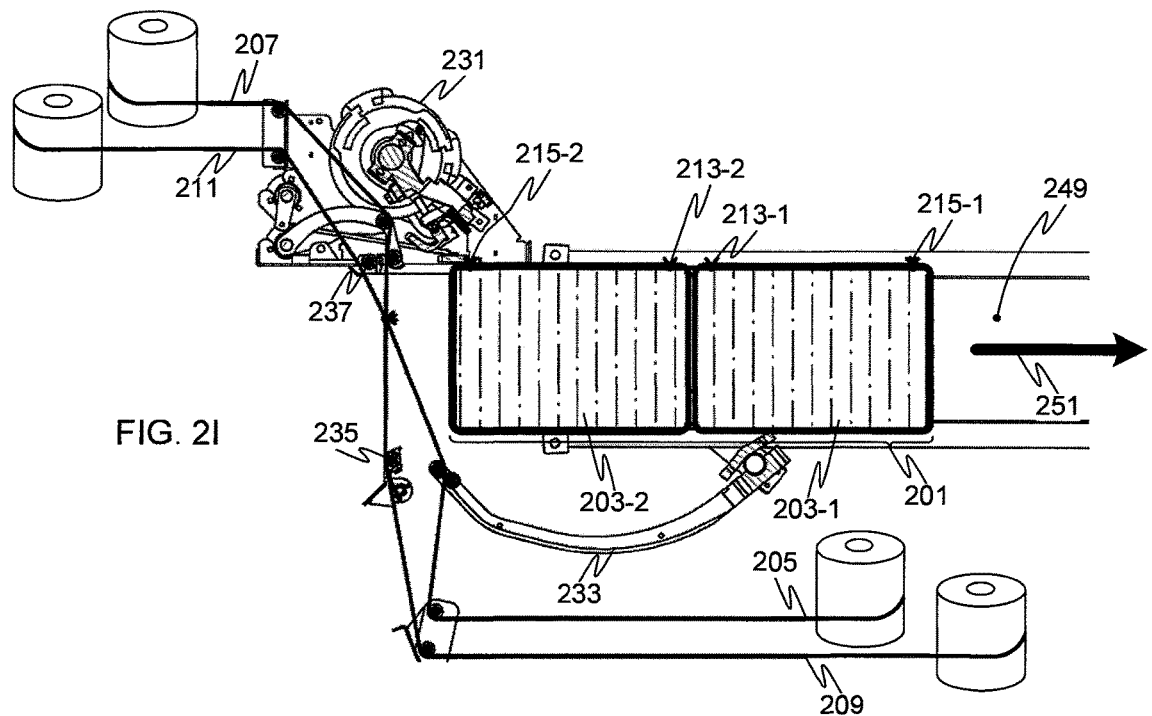

FIG. 2F depicts the hay for the second single bale 203-2 pushed into place in the bale chamber 249 awaiting the four strings to be tied to complete the multi-part bale 201. In FIG. 2G the needle 233 has shifted upward picking up both the short cincture-string 205 and long cincture-string 209 as needle 233 articulates upward. The needle 233 also picks up short top-string 207 and long top-string 211 as it moves upward. In FIG. 2H double knotter 231 receives the four strings from needle 233, tying four-string knot 215-2 to complete the multi-part bale. Four string knot 215-2 ties together: (1) short cincture-string 205, (2) long cincture-string 209, (3) short top-string 207, and (4) long top-string 211, thus completing the second single bale 203-2 as well as multi-part bale 201. FIG. 2I shows completed bale 201. The four strings have been cut above the knot 215-2 allowing the completed bale 201 to be pushed forward in the bale chamber 249 and out of the double small square baler, making room for hay for the next bale to be pushed into the bale chamber 249. The needle 233 has hinged downward to its initial position awaiting hay for the next multi-part bale, and the four strings 207, 211, 205 and 209 are tied in a four-string knot 215-3 in anticipation of beginning the string assemblies for the next bale.

The high density double small square baler is capable of compressing hay at a higher density than conventional small square balers by increasing the plunger force. This makes the multi-part bales weigh more per inch of length than conventional bales. Thus, multi-part bale made to be standard small square bale size (e.g., sized at approximately 14" high×18" wide×40" long) weighs more than a similarly sized conventional bale. This reduces storage costs since more hay can be stored in a given facility. It also tends to reduce transportation costs since hay is not a particularly heavy material and hay trucks are generally not loaded to their maximum allowable weight. The heavier, more dense multi-part bales allow more hay to be hauled for a given sized truck. Moreover, tying the two short single bales together into a standard sized multi-part bale allows use of existing automated bale handling equipment, trucks, hay wagons and storage facilities that are designed and built for the standard sized square bales.

Figure 3:
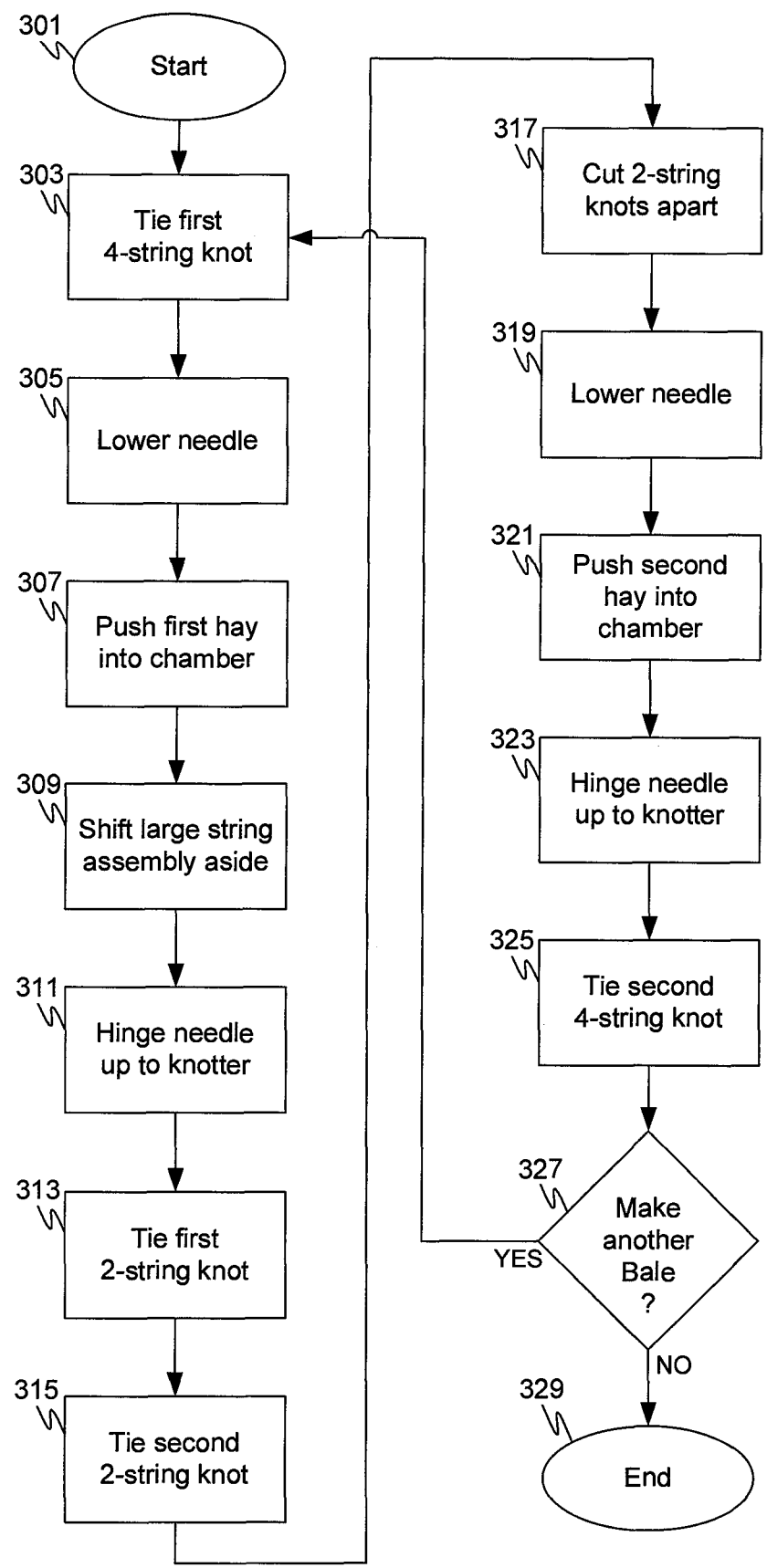
FIG. 3 depicts a flowchart for a method of using a high density double small square baler according to various embodiments disclosed herein.

FIG. 3 depicts a flowchart for a method of using a high density double small square baler according to various embodiments disclosed herein. The method begins in block 301 and proceeds to block 303 where the first four-string knot is tied by the double knotter, e.g., the four-string knot 115-1 shown in FIG. 1D. In practice the first of a bale is tied immediately after the last knot of the previous bale is tied before the needle is lowered. In this way the baler does not need to go through another revolution (lowering and raising of the needle) to start the next bale. Upon tying the first four-string knot the method proceeds to block 305 to lower the needle out of the way in order to receive hay in the bale chamber.

Once the needle has been lowered in block 305 the method proceeds to block 307 and a plunger pushes hay into the bale chamber for the first single bale. In block 309 the shifters move the two pieces of string for the large string assembly aside (e.g., strings 109 and 111 of FIG. 1B), out of the string plane. This clears the way for the needle to hinge upward in block 311. As the needle hinges upward in block 311 it pushes the short cincture-string upward, and also pushes the short top-string upward into the knotter (e.g., strings 105 and 107 of FIG. 1B). Since the long cincture-string and long top-string were pushed to the side by the shifters they are not pushed into the knotter at this time.

Once the short cincture-string and short top-string are in the knotter the method proceeds to block 313 where the first two-string knot is tied (e.g., knot 113-1 of FIG. 1D). This completes the first single bale (e.g., bale 203-1 of FIG. 2C). The method proceeds to block 315 for the tying of the second two-string knot (e.g., knot 113-2 of FIG. 1D). In block 317 the strings in the knotter are cut apart to separate the first two-string knot from the second two-string knot. The method proceeds to block 319 where the needle is lowered back to its initial position beneath the bale chamber. In various implementations the needle remains in the knotter while the first and second two-string knots are tied and then cut apart. In other implementations, however, the needle may be lowered at the same time as the knots are being tied and cut apart. Once the needle is lowered the method proceeds to block 321.

In block 321 the plunger is again activated to push more hay into the bale chamber for the second single bale of the multi-part bale. Once the predefined amount of hay is in the chamber the needle is again hinged upward. As the needle moves upward it initially reaches the long cincture-string and the second short cincture-string, pushing them upward (e.g. e.g., strings 105 and 109). As the needle continues hinging upward it reaches the long top-string and second short top-string, pushing these strings as well. The needle thrusts into the knotter in block 323, pushing all four strings into the knotter. The method proceeds to block 325 and the knotter ties the second four-string knot to complete the multi-part bale. As a matter of practice the knotter cuts the four strings and ties another knot in anticipation of making another multi-part bale. If another bale is to be made the method proceeds along the "YES" path from block 327 and the process being again. As needle is lowered again and hay is pushed into the bale chamber the completed multi-part bale is pushed further along in the bale chamber on its way out of the baler. If no more bales are to be made the method proceeds along the "NO" path from block 327 and ends in block 329.

Some of the activities may be included or excluded as described above, or performed in a different order as is known by those of ordinary skill in the art, while still remaining within the scope of at least one of the various embodiments. For example, as a practical matter once a multi-part bale is completed by tying the second four-string knot in block 325 the knotter ties another four-string knot and cuts the two knots apart. In this way there won't be any loose string ends that need to be held. Instead the string sources are tied together—string source 211 is tied to string source 205 and string source 207 is tied to string source 209. The string sources may be string spools, balls or spools any other method of storing and transporting string known to those of ordinary skill in the art. It may be the case that a single string source serves dual purposes. For example, a single spook may feed two strands to the knotter, e.g., one strand from the inside of the spool and the other string from the outside.

The terminology used herein describes the embodiments outlined in this specification, and is not intended to limit the invention. The terms "up" or "upward" refer to a direction tending away from the center of the earth. The terms "directly up" or "directly upward" (or "directly down" or "directly downward") are more precise terms referring to the direction straight upward away from the center of the earth. The phrases "removably attached", "removably affixed" or "removably mounted", as used herein, mean a part (or mechanism, component device, unit etc.) that can be attached to another part, and later removed without destroying or damaging either part or the mechanism for removably attaching the two pieces. For example, a threaded nut is removably attachable from a bolt. A king bolt is removably attachable to a wagon tongue. However, one piece of metal welded onto another piece of metal is not removably attached. Also, one part that is riveted onto another part is not considered to be removably attached since the rivets must be destroyed to separate the two parts. Two parts that are "permanently attached" or "permanently affixed", as used herein, are attached in a manner that is not conducive to separating the parts without damaging one part or the other, or damaging the means of attaching them together. Two parts may be "permanently attached" (or "permanently affixed"), for example, by being welded, glued or riveted together. Further two parts that are formed from the same piece of material are considered to be permanently attached together.

The phrase "at least proximate" refers to a component's location relative to another item. For example, a long cincture-string may be located at least proximate to the two short cincture-strings of a multi-part bale. "At least proximate" can also mean within a distance no greater than the largest dimension of the thing itself. For example, a lower shifter that moves out of the string plane while remaining at least proximate to it may move a short distance—say 2 inches—which is less than the longest dimension of the shifter.

For ease of explanation and clarity the various embodiments of balers disclosed herein that produce multi-part bales have been described in terms of the string assemblies being tied to run across the top lengthwise, down the sides, and across the bottom. It would be possible for a baler to be built that ties the string assemblies around the perimeter instead of across the top and bottom sides. In such a case the upper and lower shifters would become the right and left shifters, and the various descriptions using up, down, above, below, etc. would be reworded to equivalently describe the various embodiments in terms of left and right.

The various embodiments have been described herein in terms of using a double knotter (e.g., double knotter 231 of FIGS. 2A-I). However, it is possible—although more cumbersome—to build a multi-part baler with single knotter(s) in place of the double knotter. The single knotter(s) would need to be configured with the ability to tie a knot (e.g., two-string knot 213-1), cut the strings while holding the ends, and then tie another knot (e.g., two-string knot 213-2). This could be done with design changes to a single knotter and associated mechanisms for holding and feeding the various strings to the single knotter.

A bale is a bundle of hay, cotton, or other materials tightly wrapped and bound with twine, wire, cords or hoops. Although the descriptions in this document have referred to bales as hay bales, the various embodiments may be implemented with any number of crops or other materials. For example, the various embodiments may be used to make multi-part bales of hay, straw, grass, corn stalks, pine needles, sugar cane mulch, or multi-part bales made from plant stems, stalks, shafts, sticks, and/or leaves of any other plants that are known to those of ordinary skill in the art. Moreover, the various embodiments may be implemented with any number of other materials formed into multi-part bales, including for example, paper, lumber, shingles, pipe, tubing, insulation, bricks, tiles or any other material that could be baled for transport or storage, as such materials are known by those of ordinary skill in the art. This document uses the term "string" to describe the material used to create bales. "String" as used herein is defined to include twine, rope, cord, wire, strapping, or other long flexible strands that one of ordinary skill in the art considers suitable for use in a baler. The term "row of string assemblies", as this term is used herein, means the string assemblies (i.e., pieces of string) of a multi-part bale and the string assemblies of two or more single bales that are all within the same plane. FIG. 1D shows two rows of string assemblies 121 for the multi-part bale 101.

This document refers to "small square bales" in various descriptions throughout the disclosure. The term "small square bale" is a term of art in the hay industry. Small "square" bales have sides that are more or less flat and are roughly rectangular shaped—and not necessarily square—as viewed from the side, the end or the top. The sides come together at edges that are more or less square (i.e., 90 degrees), as opposed to large round bales that are cylindrical in shape. Standard sized small square bales are approximately 14" high×18" wide×40" long, but may be up to 16" high and 22" wide. The length of small square bales can vary considerably, typically from as little as 35" to as long as 50". The various embodiments disclosed herein may be implemented in any of these dimensions, or other larger or smaller dimensions, depending upon the desired characteristics for weight and volume, e.g., the load bearing parameters and dimensions of the vehicles to be used for transport and the storage facilities.

There are conventional three-string small square bales and conventional two-string small square bales. The dimensions of a standard sized two-string small square bale are approximately 14" high×18" wide×40" long. The weight of a conventional two-string small square hay bale is around 60 pounds for hay, but may be much higher or lower depending upon the density of the materials or weight of the crop being baled. Straw bales are slightly lighter. Three string bales are less common than two string bales. The dimensions of a conventional three-string small square bale are approximately 16" high×22" wide×44" long. The weight of a typical three-string small square hay bale is around 100 pounds. The term "single bale" (or "single square bale"), as this term is used herein, means a quantity of material (e.g., hay) surrounded by a multi-piece string assembly to form a bale that may be one of two or more bales formed into a multi-part bale. For example, FIG. 1D depicts multi-part bale 101 formed by two single bales 103. At least one of the single bales within a multi-part bale has a knot in common with the multi-part bale. Typically, both of the single bales in a dual bale multi-part bale have a knot in common with the string assembly wrapped around the outside of the multi-part bale. A single bale, as disclosed herein, may be smaller in volume than a typical sized two-string bale. A multi-part bale may be compressed to have a higher density, and thus weigh more, than a conventional bale of the same size.

A knot is a fastening between two pieces of string (or two ends of the same piece of string) made by tying one piece of string to the other. A two-string knot that ties together two strings is said to be a two-string knot comprising the two strings (or two pieces of string). A four-string knot that ties together four strings is said to be a four-string knot comprising the four strings.

The term "multi-part bale", as this term is used herein, means a bale that is formed by tying together multiple smaller sized bales. FIG. 1D depicts multi-part bale 101 consisting of two single bales 103. A multi-part bale typically has at least one knot in common with at least one of the single bales it contains, e.g., a four-string knot. This document describes multi-part bales tied with two four-string knots in each row of string assemblies. In some embodiments each four-string knot ties two strings from a single bale to two strings from the multi-part bale (that is, two strings that encompass the entire multi-part bale. Thus, the four-string knots are in common inasmuch as they tie the strings of the multi-part bale to strings from one of its single bales. In some embodiments the multi-part bale may be tied with only one four string knot, thus having only one knot in common with one of its single bales per each row of string assemblies. In other embodiments the multi-part bale may be tied using only two-string knots, and doesn't have any knots in common with its single bales. In a multi-part bale of three or more bales, the interior single bale(s) may, in some implementations, not be tied into the multi-bale outer string assembly with four-string knots. Instead, the single interior bale(s) may be held in place by the outer string assembly and pressure from the outside single bales.

This document describes implementations where two single bales are tied together to form one multi-part bale of roughly the same size as a standard sized small square bale. In various other multi-part bale implementations more than two single square bales are tied together to form a larger sized multi-part bale; e.g., three mini sized single bales, four mini sized single bales, or any other number of mini sized single bales may be tied together into a multi-part bale as such number would be known by one of ordinary skill in the art. A "mini sized" bale is a bale smaller than a standard sized small square bale of approximately 14" high×18" wide×40" long.

As used herein, the singular forms "a", "an" and "the" are intended to include the plural forms as well, unless the context clearly indicates otherwise. It will be further understood that the terms "comprises," "comprising," "includes," and/or "including" used in this specification, including the claims, specify the presence of stated features, integers, steps, operations, elements, and/or components, but do not preclude the presence or addition of one or more other features, integers, steps, operations, elements, components, and/or groups thereof. The terms "obtaining" or "providing", as used herein and in the claims, means to retrieve an article or device to be assembled as part of the apparatus at issue. Further, the terms "obtaining" or "providing" may be defined to mean fabricating, or adapting another part to operate as the article or device. For example, bending up the ends of a bottom panel to form side panels can be interpreted as providing side panels attached to a bottom panel. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not included in the "plurality" and are therefore, not referred to by "each."

The terms "parallel" and "planar" are used herein in a workmanship descriptive sense, and are not necessarily defined in a strict mathematical sense. For example, the string assembly 119 of the multi-bale shown in FIG. 1D is described as being parallel to string assemblies 117 of each single bale contained in the multi-bale. In practice the string assembly 119 may be in contact with the string assemblies 117 part of the way around the bale, but may also be a quarter of an inch or even a full inch away from the string assemblies 117 on the other side of the bale. Thus, while one of ordinary skill in the art would understand what is intended by the statement that the two string assemblies are parallel, they are not technically parallel in a mathematical sense. Similarly, the terms "plane" and "planar" are used herein in a workmanship descriptive sense, and are not necessarily used to describe a strict mathematical plane. For example, the strings feeding into the string assemblies 117 and 119 are said to be within in the "string plane" as the multi-part bale is being formed. However, in practice the strings may be outside a strict mathematical plane by, say, 0.25 inch or some other de minimis distance. Nonetheless, the "string plane" is considered to be planar in a workmanship descriptive sense. The shifter (e.g., lower shifter 235 or upper shifter 237) moves strings out of the string plane by moving the strings a non-de minimis distance that is sufficient to avoid interfering with the needle as is passes past the string and shifter.

The corresponding structures, materials, acts, and equivalents of any means plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope or gist of the invention. The various embodiments included for discussion herein were chosen and described in order to best explain the principles of the invention and the practical application, and to enable others of ordinary skill in the art to understand the invention for various embodiments with various modifications as are suited to the particular use contemplated.

What is claimed is:

1. A multi-part square baler comprising:
   a bale chamber configured to receive a multi-part bale encompassed by a multi-bale string assembly formed in a string plane, the multi-part bale including at least a first single bale encompassed by a first single-bale string assembly formed in the string plane;
   a plurality of string sources including a first string source, a second string source, a third string source and a fourth string source, wherein the first string source is configured to provide a first single-bale top-string and a second single-bale top-string, the second string source is configured to provide a multi-bale top-string, the third string source is configured to provide a first single-bale cincture-string and a second single-bale cincture-string, and the fourth string source is configured to provide a multi-bale cincture-string;
   a knotter configured to tie a four-string knot comprising the first single-bale top-string, the multi-bale top-string, the first single-bale cincture-string and the multi-bale cincture-string, the knotter further being configured to tie a two-string knot comprising the first single-bale top string and the first single-bale cincture-string;
   a needle configured to feed the first single-bale top-string, the multi-bale top-string, the first single-bale cincture-string and the multi-bale cincture-string into the knotter to tie the four-string knot, the needle being further configured to feed the first single-bale top-string and the first single-bale cincture-string into the knotter to tie the two-string knot; and
   a shifter configured to shift the multi-bale top-string and the multi-bale cincture-string out of the string plane as the needle feeds the first single-bale top-string and the first single-bale cincture-string into the knotter.

2. The multi-part square baler of claim 1, wherein the knotter is further configured to cut the first single-bale top-string and the first single-bale cincture-string upon completing the two-string knot.

3. The multi-part square baler of claim 2, wherein the knotter is a double knotter.

4. The multi-part square baler of claim 1, wherein the shifter is a first shifter, the multi-part square baler further comprising:
   a second shifter configured to shift the multi-bale cincture-string out of the string plane as the needle feeds the first single-bale top-string and the first single-bale cincture-string into the knotter.

5. The multi-part square baler of claim 1, wherein the multi-part bale includes a second single bale encompassed by a second single-bale string assembly formed in the string plane.

6. The multi-part square baler of claim 4, wherein the four-string knot is a first four-string knot and the two-string knot is a first two-string knot; and
   wherein the knotter is further configured to tie a second four-string knot comprising the second single-bale top-string, the multi-bale top-string, the second single-bale cincture-string and the multi-bale cincture-string, the knotter further being configured to tie a second two-string knot comprising the second single-bale top-string the second single-bale cincture-string.

7. The multi-part square baler of claim 6, wherein the knotter is configured to cut the first single-bale top-string and the first single-bale cincture-string between the first two-string knot and the second two-string knot.

* * * * *